United States Patent [19]

Hixenbaugh et al.

[11] Patent Number: 4,646,315
[45] Date of Patent: Feb. 24, 1987

[54] ARC FURNACE BURNER CONTROL METHOD AND APPARATUS

[75] Inventors: Dennis L. Hixenbaugh, Pittsburgh; Ronald C. Gossar, Trafford, both of Pa.

[73] Assignee: Pennsylvania Engineering Corporation, Pittsburgh, Pa.

[21] Appl. No.: 657,745

[22] Filed: Oct. 4, 1984

[51] Int. Cl.⁴ .......................................... F27D 17/00
[52] U.S. Cl. ........................................ 373/2; 373/9
[58] Field of Search .................... 373/1, 2, 8, 9, 60; 266/144, 156, 157, 158, 159; 432/65, 72, 175; 431/19, 20; 236/15 C

[56] References Cited

U.S. PATENT DOCUMENTS

| | | |
|---|---|---|
| 1,002,988 | 9/1911 | Helfenstein . |
| 2,680,493 | 6/1954 | Dorfan . |
| 3,167,420 | 1/1965 | Robiette . |
| 3,173,980 | 3/1965 | Hysinger . |
| 3,197,539 | 7/1965 | Hinds . |
| 3,237,930 | 3/1966 | Hoffmann . |
| 3,346,250 | 10/1967 | Strassburger . |
| 3,459,867 | 8/1969 | Estes . |
| 3,576,318 | 4/1971 | Spencer et al. . |
| 3,697,229 | 10/1972 | Frey et al. . |
| 3,873,073 | 3/1975 | Baum et al. . |
| 3,920,447 | 11/1975 | Schroeder et al. . |
| 3,990,686 | 11/1976 | Iguchi et al. . |
| 3,997,711 | 12/1976 | Stark et al. . |
| 4,055,334 | 10/1977 | Stephens . |
| 4,077,614 | 3/1978 | Udo ............................ 373/2 |
| 4,156,102 | 5/1979 | Mainot et al. ............... 373/2 |
| 4,347,869 | 9/1982 | Strobel et al. . |
| 4,450,569 | 5/1984 | Hagendoorn ............... 373/9 |

FOREIGN PATENT DOCUMENTS 1936649 2/1970 Fed. Rep. of Germany .

OTHER PUBLICATIONS

PEC Air Pollution Control, published 9/81.
Lectromelt Oxy-Fuel Systems, published 3/82.
Scrap Heating System, published 11/83.

Primary Examiner—Roy N. Envall, Jr.
Attorney, Agent, or Firm—Fred Wiviott

[57] ABSTRACT

An electric arc furnace having at least one electrode and a burner and first and second supply systems for respectively supplying an oxygen containing gas and fuel to the burner. An exhaust gas conduit is connected to the furnace and includes a first damper for controlling the flow rate of exhaust gases and a second damper for controlling the flow of dilution air into the exhaust conduit. First and second position sensors are coupled to the first and second dampers, respectively, for sensing the positions thereof, a temperature sensor is coupled to the exhaust conduit for sensing the temperature therein and a pressure sensor is coupled to the furnace for sensing the furnace pressure. A first control is coupled to the first supply system and to the temperature sensor and to the first position sensor for initiating and controlling the flow of oxygen containing gas in relation to the temperature in the conduit and the position of the first damper. A second control is coupled to the second supply system, the second position sensor and to the pressure sensor for initiating and controlling the flow of fuel in relation to the flow rate of oxygen containing gas, the position of the second damper and the pressure within the furnace.

23 Claims, 1 Drawing Figure

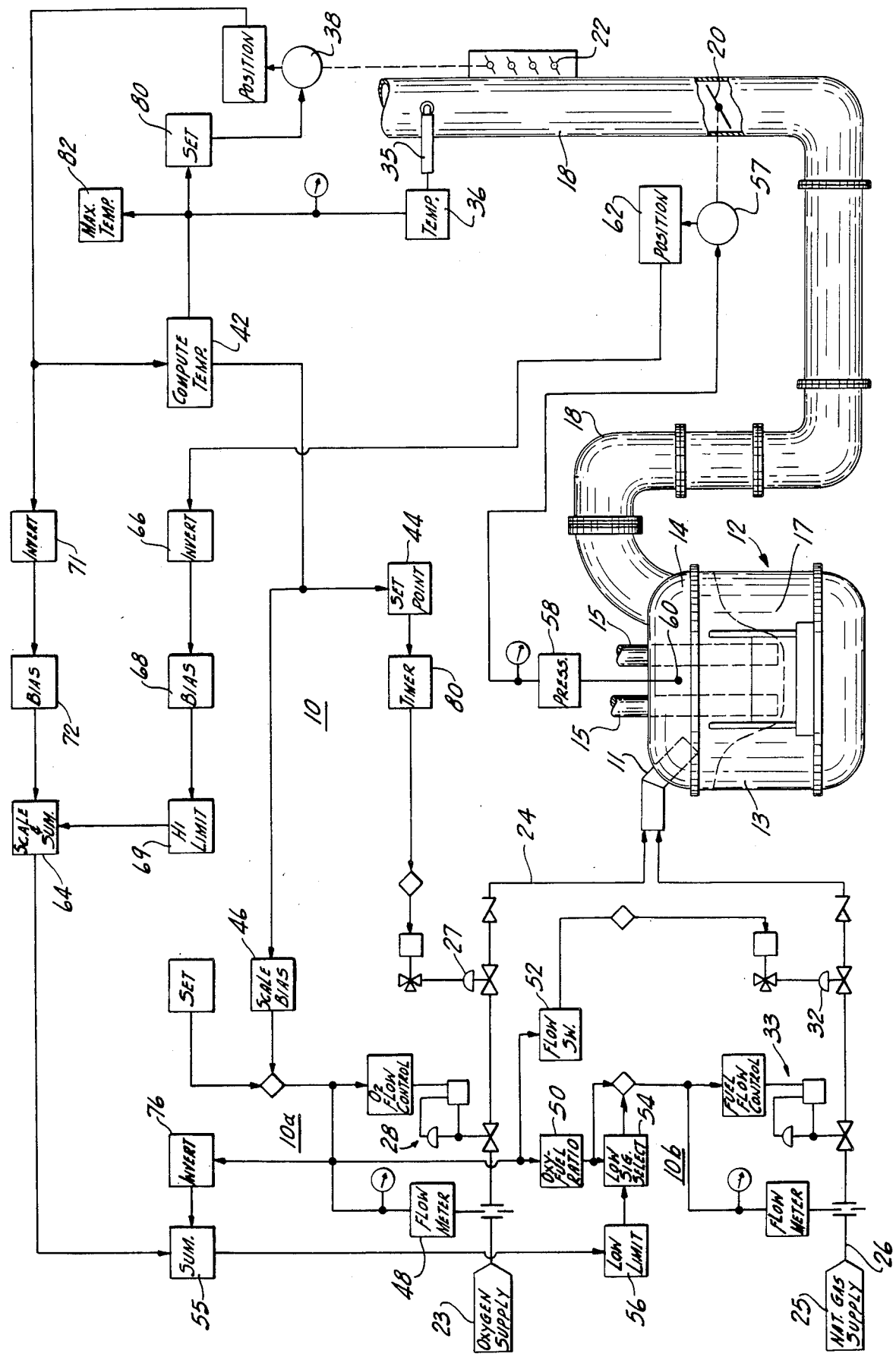

ARC FURNACE BURNER CONTROL METHOD AND APPARATUS

BACKGROUND OF THE INVENTION

The invention relates to the method and apparatus for controlling the flow of oxygen and fuel to the burner in an electric arc furnace.

Electric arc furnaces are commonly employed for melting scrap metal which is then further treated in subsequent steel making operations. The heat required for scrap melting is generated by electrical discharges or arcs which pass between the furnace electrodes or between the electrodes and the scrap charge. In order to preheat the furnace and the scrap metal, and to assist in the melting operation, arc furnaces are often provided with oxy-fuel burners. Such burners are shown, for example, in U.S. Pat. Nos. 3,197,539; 3,237,930; 3,459,867; 4,076,617; and 4,156,102. While prior art arc furnaces did achieve some increase in energy efficiency by employing oxy-fuel burners, the burners themselves normally operated at a fuel efficiency range of about sixty percent or less.

SUMMARY OF THE INVENTION

It is an object of the invention to provide a method and apparatus for controlling the flow of fuel and oxygen to a burner in an electric arc furnace.

Another object of the invention is to provide a method and apparatus for controlling the flow of fuel and oxygen to the burner of an electric arc furnace which utilizes combustible materials in the scrap metal charge.

A further object of the invention is to provide a method and apparatus for controlling the flow of fuel and oxygen to the burner in an electric arc furnace which reduces the load on gas cleaning and handling equipment.

According to one of its aspects, the invention comprises an electric arc furnace having at least one electrode, a burner and first and second supply means for respectively supplying an oxygen containing gas and a fuel to the burner. An exhaust gas conduit is connected to the furnace and first and second dampers are connected to the conduit for respectively controlling the flow of dilution air into the exhaust conduit and the flow rate or exhaust gases therethrough. First and second means are coupled to the first and second dampers, respectively, for sensing the positions thereof. Temperature sensing means is coupled to the exhaust conduit for sensing the temperture therein and pressure sensing means is coupled to the furnace for sensing furnace pressure. First control means is coupled to the first supply means, the temperature sensing means and the first means for initiating and controlling the flow of oxygen containing gas in relation to the temperature in the conduit and the position of the first damper means, and second control means is coupled to the second supply means, to the second means and to the pressure sensing means for initiating and controlling the flow of fuel in relation to the flow rate of oxygen containing gas, the position of the second damper means and the pressure within the furance.

According to a second aspect, the invention comprises the method of controlling the flow of an oxygen containing gas and fuel to a burner located in an electric arc furnace having at least one electrode, an exhaust gas conduit connected to the furnace and first and second damper means connected in the conduit for respectively controlling the flow rate of exhaust gases and the flow of dilution air into the exhaust conduit. The method comprising the steps of: sensing the positions of the first and second damper means, the temperature within the exhaust conduit and the pressure within the furance and initiating and controlling the flow of oxygen containing gas to the burner in relation to the temperature in the exhaust gas conduit and the position of the first damper and initiating and controlling the flow of fuel to the burner in relation to the flow rate of oxygen containing gas, the position of the second damper means and the pressure within the furnace.

The single FIGURE of the drawing schematically illustrates control system in accordance with the preferred embodiment of the invention.

DETAILED DESCRIPTION OF THE PREFERRED EMBODIMENT

The invention comprises a control system 10 for controlling the flow of fuel and oxygen to a burner 11 which is mounted in an electric arc furnace 12. The furnace 12 is schematically illustrated to include a hollow body 13 and a roof 14. Those skilled in the art will appreciate that the furnace body and cover generally include a metallic shell and a refractory lining having a composition which is well known in the art and may be dependent upon the material being melted.

One or more electrodes 15 extend through suitable openings in the furnace roof 14 and each may be energized by alternating or direct current which results in the formation of an arc between the electrodes 15 or between the electrodes 15 and a metallic charge 17 contained within the furnace body 13. Electrodes 15 are conventional and may comprise a carbonaceous material, such as graphite, or any other well known type of an electrode.

The burner 11 is normally employed for preheatng the scrap 17 and to assist the electrodes 15 in melting the scrap charge 17. Gases generated during the preheating, melting and other furnace operations are collected in an exhaust pipe 18 which may be connected to a suitable gas cleaning system (not shown). Disposed within the exhaust pipe 18 is damper 20 for controlling the flow of waste gases through the pipe 18 and a damper 22 for controlling the introduction of dilution air into the waste gas products.

The control system 10 which includes an oxygen control 10a which controls the flow of oxygen to burner 11 from a source 23 through a pipe 24 and a fuel control 10b which controls the flow of fuel, such as natural gas, from a source 25 through a pipe 26 to the burner 11. Oxygen control 10a includes an on-off valve 27 and a flow controller 28 connected in pipe 24. Similarly, fuel gas control 10b includes an on-off valve 32 and a flow controller 33 connected into gas supply pipe 26. As will be described more fully below, the control 10a is operative to initiate the flow of oxygen by opening valve 27 when the temperature in the exhaust pipe 18 reaches a predetermined temperature value modified by the position of dilution air damper 22 and thereafter controls the oxygen flow by manipulating flow controller 28 in accordance with variations in these parameters. The flow of fuel gas is initiated by opening valve 32 when oxygen flow is sensed in pipe 24 and the flow controller 33 is operated to control the flow rate of fuel gas in accordance with the pressure in furnace 12, the position of the dampers 20 and 22 and the oxygen flow rate.

More particularly, the control system 10 controls the flow of oxygen from the source 23 to the burner 14 in response to a derived temperature signal consisting of a first signal functionally related to the temperature in exhaust pipe 18 downstream of dilution air damper 22 and a second signal functionally related to the position of that damper. The temperature signal is measured by a temperature measuring device, such as a thermocouple 35 connected to a signal generator 36 which generates an electrical signal functionally related to the measured temperature. A servo 38 is coupled to the signal generator 36 for positioning the dilution air damper 22 in accordance with the measured temperature signal so that the dilution air damper will be moved toward its open position in response to increases in temperature and toward its closed position in response to temperature decreases. A position sensor 40 is coupled to the servo 38 and is operative to produce a second output signal functionally related to the position of the damper 22.

The signals from the signal generator 36 and the position sensor 40 are fed to a temperature computer 42 which provides a computed off-gas temperature signal. With the dilution air damper closed, zero bias signal will be added to the temperature signal and with the dilution damper opened, a signal proportional to the dilution air flow rate is added to the measured temperature signal by the temperature computing device 42.

The computed temperature signal is fed from the temperature computer 42 to a set point controller 44 and a scale bias unit 46. The set point controller 42 is connected to on-off valve 27 and is operative to set the valve in an open position when the computed temperature signal reaches a predetermined value. The scale bias unit 46 is connected to the oxygen flow controller 28 which also receives an input signal from a flow meter 48 in the oxygen supply pipe 24. When flow is established in pipe 24, the flow meter 48 provides an actuating signal to the oxygen controller 28 which sets the oxygen flow rate at a certain percentage of maximum oxygen flow and controls the flow rate until the computed temperature reaches a second predetermined value at which point oxygen flow will be maximum or one hundred percent.

When oxygen flow is established, as detected by the flow metering device 48, the latter will provide a signal to the gas control 10b so that gas flow will be initiated and controlled. In particular the gas control 10b includes an oxygen-fuel controller 50 and a flow switch 52 coupled to receive the signal from the oxygen flow metering device 48. When the flow switch 52 is actuated, it opens the valve 32 to initiate the flow of fuel. The initial fuel flow rate will be determined by the flow controller 33 in accordance with a signal initially provided by the oxygen-fuel ratio controller 50 through a low signal selector 54. Normally the oxygen-fuel ratio controller 50 will track oxygen flow to provide a fuel flow rate so as to achieve stoiciometric combustion, except at fifty percent of total flow rate. In other words, the oxygen fuel ratio controller 50 will be calling for a fuel flow rate which will be one hundred percent at one hundred percent oxygen flow. The signal from oxygen-fuel ratio controller 50 will be provided to the low signal selector 54 which also receives a second signal from a sum unit 55 through a low limiter 56. The sum unit 55 sums signals functionally related to the positions of dampers 20 and 22 and an inverse of the percentage oxygen flow rate. This latter signal varies from fifty percent to zero as oxygen flow increases from fifty to one hundred percent. Low signal selector 54 selects the lower of the two input signals.

The damper 20 is positioned by the servo 57 which receives an input signal functionally related to the pressure within furnace 12 from a signal generator 58 connected to a pressure probe 60 within the furnace 12. The generator 58 signals will be operative to effect movement of the damper 20 towards its opened position in response to increases in pressure and towards a closed position in a response to a decrease in pressure. A position sensor 62 is coupled to the servo 57 and provides an output signal functionally related to the position of damper 20. This position signal which is provided to a scale and sum unit 64 through an inverter 66, a bias signal unit 68 and a high limit set unit 69. The scale and sum unit 64 also receives a signal functionally related to the position of dilution air damper 22 from position sensor 40 through an inverter 71 and a second signal bias unit 72.

It has been found in one operative example of the invention that optimum combustion and melt down conditions exist when the damper 20 is operating in the range of fifty to seventy percent of its fully open position and the dilution air damper 22 is twenty-five percent open. Therefore, the bias units 68 and 72, the high limit set unit 69 and the scale and sum unit 64 are set so that when damper 20 is seventy percent open and damper 22 is twenty-five percent open, the output from the scale and sum unit 64 will be four milliamps which represents a zero signal. As both or either damper begins to close from the optimum position, the output from the scale and sum unit 64 will begin to increase until a maximum signal of twenty milliamps is reached which represents one hundred percent which occurs when the damper 20 is less than fifty percent open and the damper 22 closed. To achieve this result, the bias circuit 72 will provide an output of four to eight milliamps as the positon of damper 22 varies from zero to twenty-five per cent open and the bias circuit 68 will provide an output of four to seven and two tenths milliamps as the damper 20 varies in position from sixty to seventy percent with the high limit circuit being set at seven and two tenths milliamps.

The output signal from the scale and sum unit 64 is received by a summing unit 55 which also receives a signal from flow rate measuring device 48 which is inverted by inverter 76. Since the flow controller 28 adjusts oxygen flow between fifty and one hundred percent of maximum, the output signal from inverter 76 will decrease from fifty percent to zero as the flow of oxygen increases from fifty to one hundred percent and conversely will increase from zero to fifty percent as oxygen flow decreases from one hundred to fifty percent.

As indicated previously, optimum conditions exist in the furnace when the damper 20 is operating in the range of fifty to seventy percent open and the dilution air damper 22 is twenty-five percent open. With both dampers at their optimum positions, the input to the sum unit 55 from the scale and sum unit 64 will be four milliamps or a zero signal. As either or both of the dampers begin to close, the output of the scale and sum circuit 64 will begin to increse until a maximum of twenty milliamps or one hundred percent is reached, with the damper 20 at or less than fifty percent and the damper 22 closed. The control action will result in the control of the fuel flow rate set point between twenty-five percent as set on low limited circuit 56 and one hundred percent as required to maintain stoiciometric conditions with the oxygen flowing at one hundred percent.

In the operation of the system, it has been found necessary to maintain the temperature of the off gases in pipe 18 between 700° F. and 950° F. Toward this end, the scale bias unit 46 is set such that a computed temperature of 700° F. will provide a fifty percent output signal and the computed temperature of 950° F. will provide a one hundred percent output signal to the flow controller 28. When the temperature reaches 700° F., the set point controller will actuate valve 20 to initiate oxygen flow. A setting circuit is operative to lock the oxygen flow at 100% when the measured temperature reaches 1000° F. and the dilution air damper is open to 80%. As the temperature varies between these limits and the oxygen flow rate varies linearly with temperature variations, the flow of fuel will be set at the lower value required either for stoiciometric conditions as indicated by the oxygen-fuel ratio controller 50 or the position of the dampers 20 and 22 as indicated by the summing device 74 and the low limit circuit 78.

The process will continue until manually shut off or oxygen flow is terminated by a timer 80. Also, the system will be interlocked to operate only during periods when power is supplied to the electrodes 15 and automatic fuel reduction will be provided by a sensor 82 if the temperature in pipe 18 exceeds some maximum prescribed limit such as 1000° F.

While only a single embodiment of the invention has been illustrated and described, it is not intended to be limited thereby but only by the scope of the appended claims.

We claim:

1. An electric arc furnaces having at least one electrode and a burner,
   first supply means for supplying an oxygen containing gas to said burner,
   second supply means for supplying a fuel gas to said burner,
   an exhaust gas conduit connected to said furnace, first damper means for controlling the flow of dilution air into said exhaust conduit,
   second damper means connected in said conduit for controlling the flow rate of exhaust gases therethrough,
   first means coupled to the first damper means for sensing the position thereof,
   second means coupled to the second damper means for sensing the position thereof,
   temperature sensing means coupled to the exhaust conduit for sensing the temperature therein,
   pressure sensing means coupled to the furnace for sensing the pressure therein,
   a first control means coupled to said first supply means and to said temperature sensing means and said first means for initiating and controlling the flow of oxygen containing gas in relation to the temperature in said conduit and the position of said first damper means,
   a second control means coupled to said second supply means and to said second means and said pressure sensing means for initiating and controlling the flow of fuel gas in relation to the flow rate of oxygen containing gas, the position of said second damper means and the pressure within said furnace.

2. The electric arc furnace set forth in claim 1 and including first positioning means coupled to said temperature sensing means and to said first damper means, said-first damper means having open and closed positions, said first positioning means being operative to move said first damper means toward its open position in response to increases in said temperature and toward its closed position in response to decreases in said temperature.

3. The electric arc furnace set forth in claim 1 wherein said first means is operative to provide a first signal functionally related to the position of said first damper means and said temperature sensing means is operative to provide a temperature signal functionally related to the temperature within the exhaust conduit, temperature computing means coupled to the first means and the temperature sensing means and operative to provide a computed temperature signal in relation to said first signal and the temperature signal, said first control means being responsive to said computed temperature signal.

4. The electric arc furnace set forth in claim 3 wherein said first control means is operative to initiate the flow of oxygen containing gas at a first rate when the computed temperature reaches a first predetermined value and to increase the flow rate of oxygen containing gas as the computed temperature increases until maximum flow is achieved at a second predetermined computed temperature.

5. The electric arc furnace set forth in claim 1 wherein the second control means is operative to control the flow rate of fuel gas in accordance with the positions of the first and second damper means and a signal related to the reciprocal of the percentage of the oxygen flow rate and a signal related to the oxygen flow rate.

6. The electric arc furnace set forth in claim 5 and including summing means coupled to said first and second means for receiving said first and second signals and for providing a zero bias output signal when said first and second damper means are each in a predetermined opened position and for providing finite bias signals when either of said dampers are out of their predetermined positions, said second control means being responsive to said bias signal.

7. The electric arc furnace set forth in claim 6 wherein said bias signal have a maximum finite value when each of said first and second damper means are in second predetermined positions.

8. The electric arc furnace set forth in claim 4 wherein the second control means is operative to control the flow rate of fuel gas in accordance with the positions of the first and second damper means and a signal related to the reciprocal of the percentage of the oxygen flow rate and a signal related to the oxygen flow rate.

9. The electric arc furnace set forth in claim 8 wherein said second means is operative to provide a second signal functionally related to the position of said second damper means and including summing means coupled to said first and second means for receiving said first and second signals and for providing a zero bias output signal when said first and second damper means are each in a predetermined open position and for providing finite bias signals when either of said damper means are out of their predetermined positions, said second control means being responsive to said bias signal.

10. The electric arc furnace set forth in claim 9 wherein said bias signal have a maximum finite value when each of said first and second damper means are in second predetermined positions.

11. An electric arc furnace having at least one electrode and a burner,
    first supply means for supplying an oxygen containing gas to said burner,
    second supply means for supplying a fuel to said burner,
    an exhaust gas conduit connected to said furnace,
    first damper means for controlling the flow of dilution air into said exhause conduit,
    second damper means connected to said conduit for controlling the flow rate of exhaust gases therethrough,
    first means coupled to the first damper means for sensing the position thereof,
    second means coupled to the second damper means for sensing the position thereof,
    temperature sensing means coupled to the exhaust conduit for sensing the temperature therein,
    a first control means coupled to said first supply means and to said temperature sensing means and said first means for initiating and controlling the flow of oxygen containing gas in relation to the temperature in said conduit and the position of said first damper means,
    a second control means coupled to said second supply means and to said first control means for initiating and controlling the flow of fuel in relation to the flow rate of oxygen containing gas.

12. The electric arc furnace set forth in claim 11 and including first positioning means coupled to said temperature sensing means and to said first damper means, said first damper means having open and closed positions, said first positioning means being operative to move said first damper means toward its open position in response to increases in said temperature and toward its closed position in response to decreases in said temperature.

13. The electric arc furnace set forth in claim 11 wherein said first means is operative to provide a first signal functionally related to the position of said first damper means and said temperaure sensing means is operative to provide a temperature signal functionally related to the temperature within the exhaust conduit, temperature computing means coupled to the first means and the temperature sensing means and operative to provide a computed temperature signal in relation to said first signal and the temperature signal, said first control means being responsive to said computed temperature signal.

14. The electric arc furnace set foth in claim 13 wherein said first control means is operative to initiate the flow of oxygen containing gas at a first rate when the computed temperature reaches a first predetermined value and to increase the flow rate of oxygen containing gas as the computed temperature increases until maximum flow is achieved at a second predetermined computed temperature.

15. The electric arc furnace set forth in claim 14 wherein the second control means is operative to control the flow rate of fuel in accordance with the positions of the first and second damper means, and a signal related to the oxygen flow rate.

16. The electric arc furnace set forth in claim 15 and including summing means coupled to said first and second means for receiving said first and second signals and for providing a zero bias output signal when said first and second dampers are each in a predetermined opened position and for providing finite bias signals when either of said dampers are out of their predetermined positions, said second control means being responsive to said bias signal.

17. The electric arc furnace set forth in claim 16 wherein said bias signal will have a maximum finite value when each of said first and second damper means are in second predetermined positions.

18. A method of controlling the flow of an oxygen containing gas and a fuel to a burner located in an electric arc furnace having at least one electrode, an exhaust conduit connected to having at least one electrode, an exhaust conduit connected to the furnace, first damper means connected to the conduit for controlling the flow of dilution air into the exhaust conduit and second damper means for controlling the flow of exhaust gases therethrough, the method comprising the steps of:
    sensing the position of the first damper means,
    sensing the position of the second damper means,
    sensing the temperature within the exhaust conduit,
    sensing the pressure within the furnace,
    initiating and controlling the flow of oxygen containing gas to burner in relation to the temperature in the conduit and the position of the first damper means, and
    initiating and controlling the flow of fuel to the burner in relation to the flow rate of oxygen containing gas, the position of the second damper means and the pressure within the furnace.

19. The method set forth in claim 18 including the steps of moving the first damper means toward its opened position in response to increases in the temperature within the exhaust conduit and towards its closed position in response to temperature decreases therein.

20. The method set forth in claim 19 and including the step of determining a computed temperature from the temperature within the exhaust conduit in the position of the first damper means, and initiating and controlling the flow of oxygen containing gas to the burner in relation to the computed temperature.

21. The method set forth in claim 20 and including the step of initiating the flow of oxygen containing gas when the computed temperature reaches first predetermined value and increasing the flow rate of oxygen containing gas as the computed temperature increases until the maximum flow is achieved at a second predetermined computed temperature.

22. The method set forth in claim 22 and including the step of controlling the flow rate of fuel in accordance with the position of the first and second damper means, the reciprocal of the percentage of the oxygen flow rate and the oxygen flow rate.

23. The method set forth in claim 22 and including the step of providing a bias signal functionally related to the positions of the first and second damper means, said bias signal having a zero relative value when the first and second damper means are each in the predetermined opened position and for providing finite bias signals when either of the damper means are out of their predetermined positions, and controlling the flow rate of fuel in relation to the bias signal.

* * * * *